United States Patent [19]

Biing-Yih

[11] Patent Number: 4,930,816
[45] Date of Patent: Jun. 5, 1990

[54] JOINING STRUCTURES FOR METAL PIPES

[76] Inventor: Hwang Biing-Yih, No. 89, Lin Yen South Road, Lin Yen Shian, Kaohsiung Hsien, Taiwan

[21] Appl. No.: 352,933

[22] Filed: May 17, 1989

[51] Int. Cl.⁵ ............................................. F16L 21/04
[52] U.S. Cl. ................................. 285/321; 285/348; 285/356; 285/156; 285/177; 285/39; 285/363
[58] Field of Search ............... 285/348, 343, 356, 342, 285/321, 415, 351

[56] References Cited

U.S. PATENT DOCUMENTS

| | | | |
|---|---|---|---|
| 2,427,260 | 9/1947 | Cowles | 285/348 X |
| 2,452,278 | 10/1948 | Woodling | 285/343 |
| 2,497,441 | 2/1950 | Detweiler | 285/348 X |
| 2,724,602 | 11/1955 | Carey et al. | 285/348 X |
| 2,735,700 | 2/1956 | Bowan et al. | 285/348 X |
| 4,037,864 | 7/1977 | Anderson et al. | 285/348 X |
| 4,170,375 | 10/1979 | Ito | 285/348 |
| 4,506,919 | 3/1985 | Peting | 285/348 X |
| 4,776,618 | 10/1988 | Barree | 285/348 X |
| 4,792,160 | 12/1988 | Hwang | 285/348 X |

Primary Examiner—Randolph A. Reese
Assistant Examiner—Carol S. Bordar
Attorney, Agent, or Firm—Larson and Taylor

[57] ABSTRACT

A joining structure for metal pipes to be applied in each passage hole of a pipe fitting. This structure can save time in pipe fitting work, and can reinforce the mutual joined condition of a pipe and a pipe fitting.

2 Claims, 3 Drawing Sheets

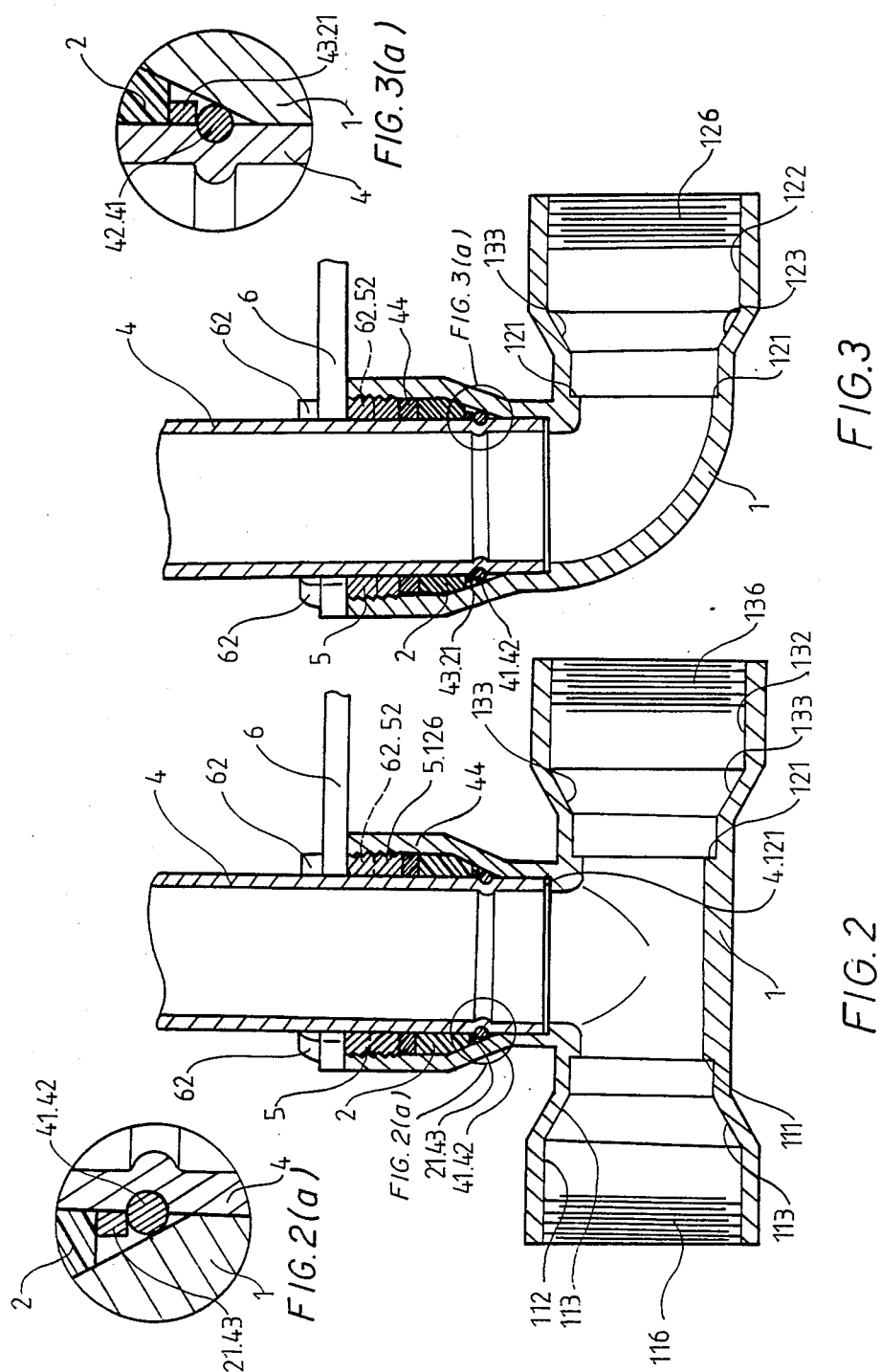

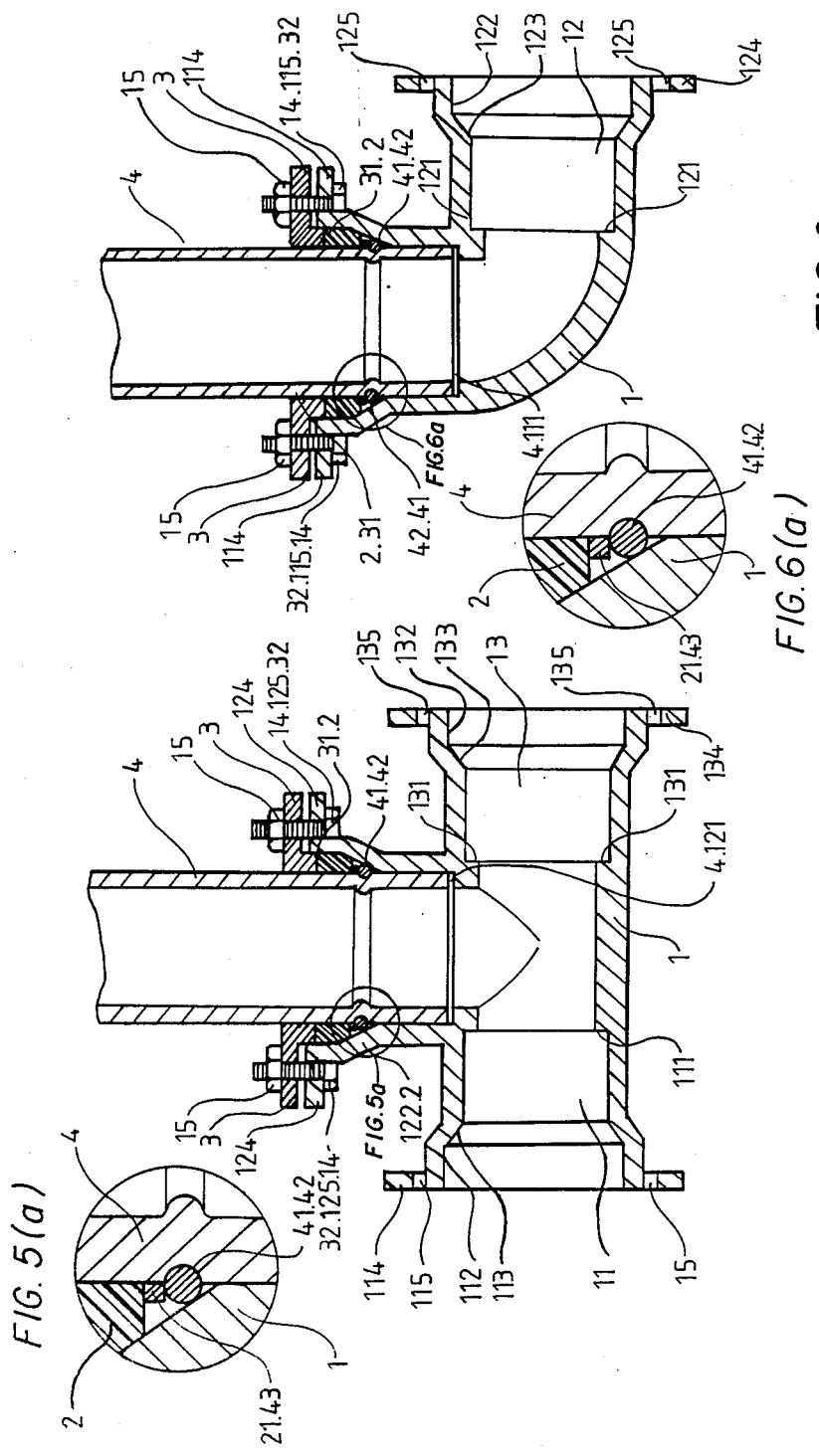

JOINING STRUCTURES FOR METAL PIPES

BACKGROUND OF THE INVENTION

Pipes used for hot water in houses are generally made of iron, usually buried in walls. But iron pipes are extremely liable to get rusted, unable to last long, so stainless pipes has gradually taken place of them. Nevertheless, there is a problem for the stainless pipes, that is, expansion caused by high temperature of hot water. The traditional method for joining pipes uses pipe fittings provided with male and female threads, which are usually a little inclined, not completely fitting with the threads on the ends of pipes. Besides, the thickness of the ends of pipes can become thinner because of the threads cut therein so that the joined sections can often brake owing to the expansion caused by hot water This applicant has often experienced this shortcoming in many years' work, and filed and acquired an American patent, Ser. No. 4,792,160, which furnishes a joining structure suitable for small diameter metal pipes and those to be hidden in walls, but not suitable for those of large diameter and those exposed.

SUMMARY OF THE INVENTION

In view of the inconvenience to use dies for cutting threads on pipes and the shortcoming of common pipe fittings just mentioned, this invention has been devised to furnish joining structures for metal pipes of large diameter.

The joining structures for metal pipes in accordance with the present invention can be applied to each passage hole of a pipe fitting such as an elbow, a tee, etc. and there are two kinds of them.

The first example of this invention is a pipe fitting having each passage hole provided with an inner smaller diameter section, an outer larger diameter section, a sloped surface section between the inner smaller diameter section and the outer larger diameter section and a blocking edge at the most inner section. The larger diameter section has female threads near the end. A pipe to be joined with this fitting has to have a circumferential groove on the outer surface a little apart from the end for a C-shaped ring to be buried half therein and to protrude up the outer surface of the pipe, and inserts in each passage hole with its end hampered at the blocking edge. Then a metal ring and an anti-leak gasket are orderly placed between the outer surface of the pipe and the inner surface of the passage hole, and an inner threaded ring is screwed with the female threads in the passage hole to compress the gasket to expand radially filling up the gap between the pipe and the pipe fitting and thus to effect leak stoppage and firm joining of the both.

The second example of the joining structure for metal pipes is also applied to each passage hole of a pipe fitting, wherein the inner smaller diameter section, the outer larger diameter section, the sloped surface section between the outer larger diameter section and the inner smaller diameter section, and the blocking edge are all the same as the first example. But it has a flange to assemble with a lid by means of bolts and nuts, and the lid has a circumferential downward edge to compress the anti-leak gasket so that said gasket can expand radially, functioning as leak stoppage and firm joining of the both.

BRIEF DESCRIPTION OF THE DRAWINGS

This invention will now be described in detail with reference to accompanying drawings wherein:

FIG. 2 is a cross-sectional view of the first example of the joining structure for metal pipes applied to a tee in accordance with the present invention;

FIG. 2(a) is an enlarged view of the circled portion of FIG. 2;

FIG. 3 is a cross-sectional view of the first example of the joining structure for metal pipes applied to an elbow in accordance with the present invention;

FIG. 3(a) is an enlarged view of the circled portion of FIG. 3;

FIG. 4 is an exploded perspective view of the second example of the joining structure for metal pipes in accordance with the present invention;

FIG. 5 is a cross-sectional view of the second example of the joining structure for metal pipes applied to a tee in accordance with the present invention;

FIG. 5(a) is an enlarged view of the circled portion of FIG. 5;

FIG. 6 is a cross-sectional view of the second example of the joining structure for metal pipes applied to an elbow in accordance with the present invention;

FIG. 6(a) is an enlarged view of the circled portion of FIG. 6.

DETAILED DESCRIPTION OF THE INVENTION

Figure 1:
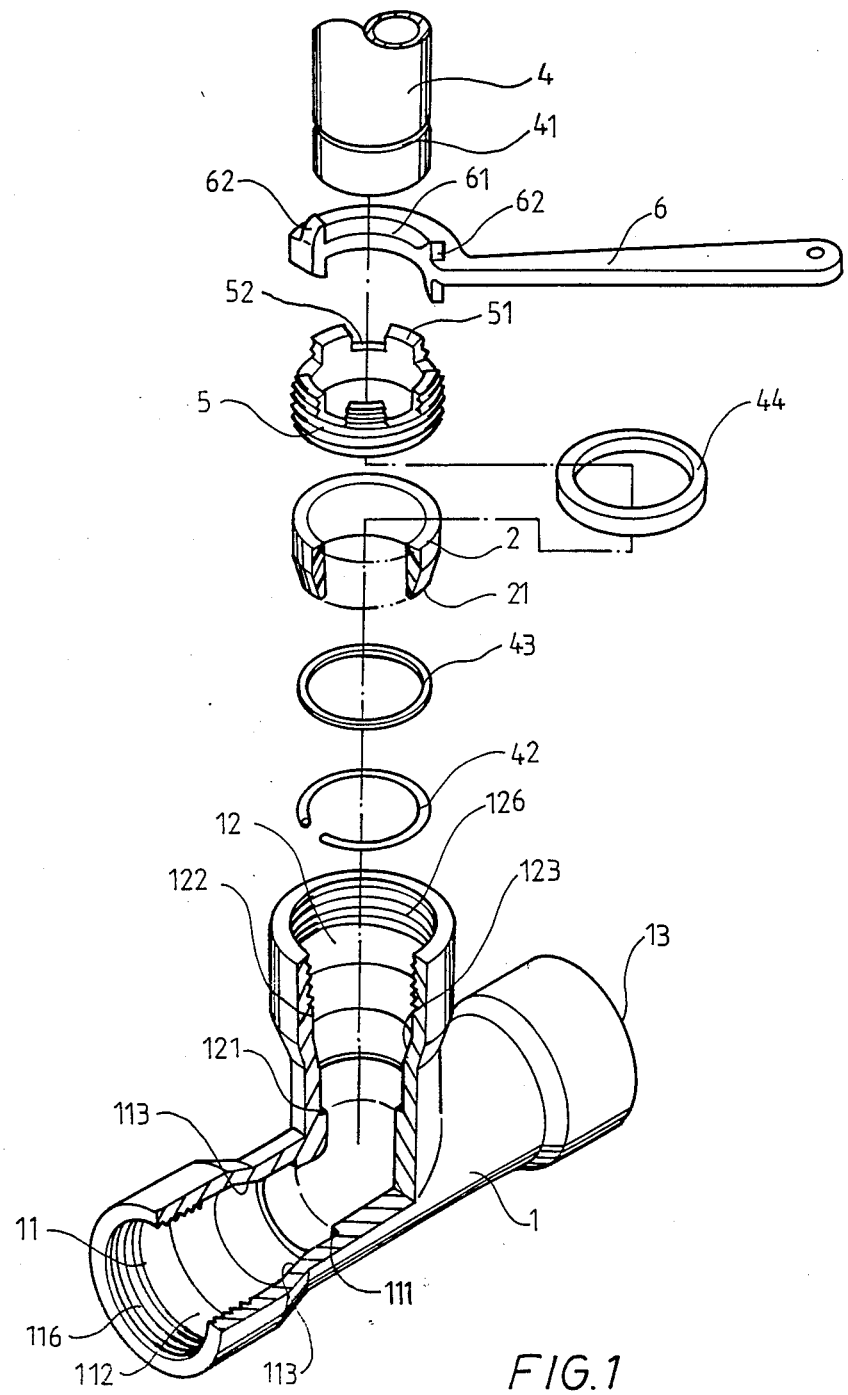
FIG. 1 is an exploded perspective view of the first example of the joining structure for metal pipes in accordance with the present invention.

The first example of the joining structure for metal pipes in accordance with the present invention, as shown in FIG. 1, comprises, a tee pipe fitting for an example, three passage holes consisting of inner smaller diameter sections 11, 12, 13, blocking edges 111, 121, 131, outer larger diameter sections 112, 122, 132 and sloped surface sections 113, 123, 133 between the inner smaller diameter sections and the outer larger diameter sections. A pipe to be joined inserts in one of the passage holes, having its end hampered at a blocking edge 111 or 121 or 131. The depth of each larger diameter section, 112 or 122 or 132 is made almost the same to prevent an antileak gasket 2 from going too deep when put therein. The outer larger diameter sections 112, 122, 132 are each provided with female threads, 116, 126, 136 to screw with inner threaded rings 5.

Next, an anti-leak gasket 2 made of rubber is fixed in the passage holes of the tee pipe fitting 1, provided at one end with a sloped surface 21 to contact correspondingly with the sloped surface 113, 123, 133 of the passage holes and at the other end with a flat surface to contact with a metal ring 44 to prevent the inner threaded ring 5 from directly rubbing against the anti-lead gasket 2 when turning.

When a common metal pipe 4 is to be joined with a pipe fitting with the joining structure in accordance with the present invention, it has to be cut with a circumferential groove 41 to be fixed at the smallest diameter edge of each sloped surface 113, 123 or 133 after the pipe 4 is inserted in one of the passage holes 11, 12, 13 with its end hampered by one of the blocking edges 111, 121, 131. Besides, a C-shaped ring 42 is fixed in the groove 41, half buried therein and half protruding up the outer surface of the pipe 4.

In order to prevent the C-shaped ring 42 from being pinched by the anti-leak gasket 2 when turning, a metal ring 43 having flat surfaces is provided between them.

The inner threaded ring 5 has a flat bottom to contact with the upper end face of the metal ring 44, a plurality of teeth 51 and notches 52 between the teeth 51 for the teeth 62 of a spanner wrench 6 to engage with, which is used to turn said ring 5 around for fitting.

The spanner wrench 6 is a special tool used for revolving the inner threaded ring 5, provided with a curved arm 61, two sideway teeth 62 on both faces of said arm 61, said teeth 62 each having a vertical face to contact with the vertical side of one tooth 51 of the inner threaded ring 5 to screw said ring 5 tight or loose.

Next, the first example of the joining structure applied to two kinds of pipe fittings, a tee and an elbow, is shown in FIGS. 2 and 3, wherein a pipe 4 is inserted in the passage hole 12, having its end hampered at the blocking edge 121, and around its outer surface are fixed the anti-leak gasket 2, the inner threaded ring 5, the C-shaped ring 42, the metal ring 43, and metal ring 44. The inner threaded ring 5 has to be screwed with the spanner wrench 6 until the anti-leak gasket 2 is forced by said ring 5 and hampered by the C-shaped ring 42 and the metal ring 43 to expand radially rather than lengthwise so that said gasket 2 can fill in the gap between the inner surface of the fitting 1 and the outer surface of the pipe 4, preventing water from leaking therefrom.

Referring to FIG. 4, the second example of this invention also has a tee pipe fitting 1 with three passage holes consisting of the inner smaller diameter sections 11, 12, 13, the outer larger diameter sections 112, 122, 132, blocking edges 111, 121, 131 and the sloped surfaces 113, 123, 133 as the first example. Then this tee pipe fitting 1 comprises flanges 114, 124, 134 at each outer end of the passage holes 11, 12, 13 and a plurality of small holes 115, 125, 135 properly spaced apart in the flanges 114, 124, 134 for bolts 14 and nuts 15 t units lids 3 therewith.

Next, each lid 3 is provided with a plurality of small holes 32 to correspond with the holes 115, 125, 135 in the flanges 114, 124, 134. The lid 3 is also provided with a downward protruding edge 31 to fit in each of larger diameter section 112, 122, 132 of the pipe fitting 1 and to compress the anti-leak gasket 2 placed therein, and with a central large opening 33 for a pipe 4 to go through.

The pipe 4 and the anti-leak gasket 2 in the second example have the same structure as the first example.

Next, the second examples applied to two kinds of pipe fittings are shown in FIGS. 5 and 6, one for a tee, the other for an elbow. The pipe 4 is inserted in the passage hole 12 with its end hampered at the blocking edge 121, and around its outer surface are fixed the anti-leak gasket 2, the lid 3, the C-shaped ring 42 and the metal ring 43. The anti-leak gasket 2 is placed in the passage hole 12, compressed by the circumferential edge 31 of the lid 3 assembled with the flange 124 by means of the bolts 14 and the nuts 15. Therefore, when the nuts 15 are screwed tighter and tighter, the anti-leak gasket 2 is compressed harder and harder to expand radially instead of lengthwise because of the clamping of the C-shaped ring 42 at the circumferential groove 41 of the pipe 4. Then the gasket 2 fills up the gap between the pipe 4 and the fitting 1 to prevent water from leaking therefrom.

In short, the essential feature of this invention is that half of the thickness of the C-shaped ring 42 fills up the circumferential groove 41 of the pipe 3 and the other half protrudes up the outer surface of the pipe 4 and the C-shaped ring 42 obstructs the metal ring 43 and the gasket 2 so that the pressure coming from the lid 3 or the inner threaded ring 5 can compress the gasket 2 to expand radially. Consequently, the expansion of the gasket 2 and the positioning of the C-shaped ring 42 can function as leak stoppage and joining reinforcement as well. Besides, the fitting work is easy without any problems caused by the pipe expansion or the size of the pipes.

What is claimed is:

1. A system for connecting pipes together comprising:
    a joining structure for metal pipes, wherein each passage hole of a pipe fitting such as an elbow, a tee, etc., is provided with a blocking edge to hamper the end of a pipe to be joined, a larger diameter section at the outer end, a smaller diameter section at the inner section and a sloped surface between the larger diameter section and the inner smaller diameter section, said larger diameter section having female threads to screw with a inner threaded ring, a C-shaped ring to be fixed in a circumferential groove in a pipe to be joined, said C-shaped ring half buried in said groove and half protruding up the outer surface of the pipe, an anti-leak gasket to be fixed around the outer surface of the pipe, a metal ring being placed between the anti-leak gasket and the C-shaped ring and another metal ring being placed between the anti-leak gasket and the inner threaded ring, said anti-leak gasket having a sloped surface to correspond and contact with the sloped surface of the passage hole, said anti-leak gasket being set in the larger diameter section of the passage hole and possible to be compressed by the inner threaded ring when said ring is screwed more inward and to expand radially between the inner surface of the pipe fitting and the outer surface of the pipe.

2. A system for connecting pipes together comprising:
    a joining structure for metal pipes, wherein each passage hole of a pipe fitting such as an elbow, a tee, etc., is provided with a blocking edge to hamper the end of a pipe to be joined, a larger diameter section at the outer end, a smaller diameter section at the inner section and a sloped surface between the larger diameter section and the inner smaller diameter section, said larger diameter section having a C-shaped ring to be fixed in a circumferential groove in a pipe to be joined, said C-shaped ring half buried in said groove and half protruding up the outer surface of the pipe, an anti-leak gasket to be fixed around the outer surface of the pipe, a metal ring being placed between the anti-leak gasket and the C-shaped ring, said anti-leak gasket having a sloped surface to correspond and contact with the sloped surface of the passage hole, and set in the larger diameter section of the passage hole, wherein each passage hole is provided with a flange at the end, and each flange has a plurality of small holes for bolts to assemble a lid with the flange, said lid having a circumferential downward edge and provided with a plurality of small holes to correspond with the holes in the flange for assembly of said lid and said flange with nuts and bolts, where tightening of the nuts causes the anti-leak gasket to be compressed by the circumferential downward edge of the lid and to expand radially.

* * * * *